(12) United States Patent
Krishnamurthi et al.

(10) Patent No.: US 9,709,734 B2
(45) Date of Patent: Jul. 18, 2017

(54) OPTICAL COUPLER

(71) Applicant: Intel Corporation, Santa Clara, CA (US)

(72) Inventors: Mahesh Krishnamurthi, San Jose, CA (US); Judson Ryckman, Los Gatos, CA (US); Haisheng Rong, Pleasanton, CA (US); Ling Liao, Santa Clara, CA (US); Harel Frish, Qiryat Gat (IL); Oshrit Harel, Qiryat Gat (IL); Assia Barkai, Qiryat Gat (IL); Yun-Chung Na, Palo Alto, CA (US); Han-Din Liu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/085,766

(22) Filed: Mar. 30, 2016

(65) Prior Publication Data

US 2016/0209589 A1     Jul. 21, 2016

Related U.S. Application Data

(62) Division of application No. 14/335,756, filed on Jul. 18, 2014, now Pat. No. 9,348,099.

(51) Int. Cl.
*G02B 6/12*     (2006.01)
*G02B 6/122*    (2006.01)
(Continued)

(52) U.S. Cl.
CPC ......... *G02B 6/122* (2013.01); *G02B 6/12002* (2013.01); *G02B 6/132* (2013.01);
(Continued)

(58) Field of Classification Search
CPC ............... G02B 6/12; G02B 6/02; G02B 6/00
(Continued)

(56) References Cited

U.S. PATENT DOCUMENTS 5,263,111 A * 11/1993 Nurse et al. ................... 385/130
5,815,615 A *  9/1998 Taneya et al. ................. 385/50
(Continued)

FOREIGN PATENT DOCUMENTS

WO     WO2013048411 A1     4/2013

OTHER PUBLICATIONS

Search Report mailed Jul. 28, 2016 for TW Patent Application No. 104118500, 2 pages.
(Continued)

*Primary Examiner* — Kaveh C Kianni
(74) *Attorney, Agent, or Firm* — Schwabe, Williamson & Wyatt, P.C.

(57) ABSTRACT

Embodiments of the present disclosure are directed toward techniques and configurations for an optical coupler. In some embodiments, the device may include an optical waveguide to transmit light input from a light source. The optical waveguide may include a semiconductor layer, having a trench with one facet that comprises an edge formed under an approximately 45 degree angle and another facet formed substantially normal to the semiconductor layer. The edge may interface with another medium to form a mirror to receive inputted light and reflect received light substantially perpendicularly to propagate the received light. Other embodiments may be described and/or claimed.

5 Claims, 10 Drawing Sheets

(51) Int. Cl.
*G02B 6/42* (2006.01)
*G02B 6/132* (2006.01)
*G02B 6/136* (2006.01)

(52) U.S. Cl.
CPC .......... *G02B 6/136* (2013.01); *G02B 6/4214* (2013.01); *G02B 6/4296* (2013.01); *G02B 6/1228* (2013.01); *G02B 2006/121* (2013.01); *G02B 2006/12061* (2013.01); *G02B 2006/12104* (2013.01); *G02B 2006/12147* (2013.01); *G02B 2006/12152* (2013.01)

(58) Field of Classification Search
USPC ........................................................... 385/31
See application file for complete search history.

(56) References Cited

U.S. PATENT DOCUMENTS

| | | | | |
|---|---|---|---|---|
| 6,282,219 | B1 * | 8/2001 | Butler et al. .................. | 372/50.1 |
| 6,324,313 | B1 * | 11/2001 | Allman et al. .................. | 385/14 |
| 6,614,947 | B1 * | 9/2003 | Al-hemyari ........................ | 385/3 |
| 6,671,443 | B2 * | 12/2003 | Deliwala ........................ | 385/125 |
| 6,934,455 | B2 * | 8/2005 | Skinner et al. ................ | 385/129 |
| 7,260,293 | B1 * | 8/2007 | Gunn et al. ...................... | 385/37 |
| 2002/0028045 | A1 * | 3/2002 | Yoshimura et al. ........... | 385/50 |
| 2003/0113067 | A1 * | 6/2003 | Koh et al. ........................ | 385/48 |
| 2004/0125846 | A1 * | 7/2004 | Zediker et al. ................. | 372/50 |
| 2004/0151227 | A1 * | 8/2004 | Bhowmik et al. .............. | 372/97 |
| 2006/0239605 | A1 * | 10/2006 | Palen et al. ..................... | 385/14 |
| 2009/0073420 | A1 | 3/2009 | Lin et al. | |
| 2009/0180731 | A1 * | 7/2009 | Christensen et al. ........... | 385/13 |
| 2009/0303475 | A1 * | 12/2009 | Jayaraman et al. .......... | 356/320 |
| 2010/0046883 | A1 * | 2/2010 | Dangel et al. .................. | 385/15 |
| 2011/0227116 | A1 * | 9/2011 | Saito et al. ..................... | 257/98 |
| 2011/0286695 | A1 * | 11/2011 | Wu et al. ........................ | 385/14 |
| 2012/0057822 | A1 * | 3/2012 | Wu et al. ........................ | 385/49 |
| 2012/0195336 | A1 * | 8/2012 | Fang et al. ................. | 372/45.01 |
| 2013/0051729 | A1 * | 2/2013 | Chen et al. ..................... | 385/32 |
| 2013/0170795 | A1 | 7/2013 | Wu | |
| 2013/0259077 | A1 * | 10/2013 | Ben Bakir et al. ........ | 372/44.01 |
| 2013/0279845 | A1 * | 10/2013 | Kobrinsky et al. ............. | 385/14 |
| 2014/0086527 | A1 * | 3/2014 | Ban et al. ....................... | 385/33 |
| 2014/0205234 | A1 | 7/2014 | Rong et al. | |
| 2015/0253500 | A1 * | 9/2015 | Tseng et al. .................... | 385/33 |
| 2015/0303653 | A1 * | 10/2015 | Tanaka ........................... | 385/33 |

OTHER PUBLICATIONS

V. R. Almeida et al., "Nanotaper for compact mode conversion," Opt. Lett., vol. 28, No. 15, pp. 1302-1304, Aug. 2003.
Sharee McNab, "Ultra-low loss photonic integrated circuit with membrane-type photonic crystal waveguides," Opt. Express 11, 2927-2939 (2003).
International Search Report and Written Opinion for PCT Application No. PCT/US2015/029743, dated Jul. 24, 2015, 13 pages.
Notice of Allowance mailed Jan. 20, 2016 in U.S. Appl. No. 14/335,756, 19 pages.

* cited by examiner

OPTICAL COUPLER

CROSS REFERENCE TO RELATED APPLICATIONS

This application is a divisional application of U.S. patent application Ser. No. 14/335,756, entitled "OPTICAL COUPLER", filed Jul. 18, 2014, and claims priority to the Ser. No. 14/335,756 application. The Specification of Ser. No. 14/335,756 is hereby fully incorporated by reference.

FIELD

Embodiments of the present disclosure generally relate to the field of optoelectronics, and more particularly, to techniques and configurations for providing a vertical optical coupler for planar photonics circuits such as silicon photonics circuits fabricated on silicon-on-insulator (SOI) wafers.

BACKGROUND

Silicon photonics is often considered one of the most popular and successful technology platforms based on planar photonics circuits for cost effective optoelectronics integration. Optical waveguide-based photonics devices such as lasers, modulators, and detectors are typically fabricated on silicon-on-insulator (SOI) wafers. In SOI photonic systems, light is typically confined in a wafer (or chip) plane. Silicon waveguides are typically designed with submicron cross-sections, allowing dense integration of active and passive devices to achieve higher speed and lower driving power. Due to the high refractive index contrast between silicon and other media (e.g., air or glass), the numerical aperture (NA) of light exiting the silicon chip may be larger than the typical NA of optic fibers. Optical mode converters (OMCs) are typically used to improve optical coupling between optical waveguides and optic fibers. However, existing OMCs may not always provide desired efficiency and/or bandwidth and may cause polarization dependency above a desired level.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
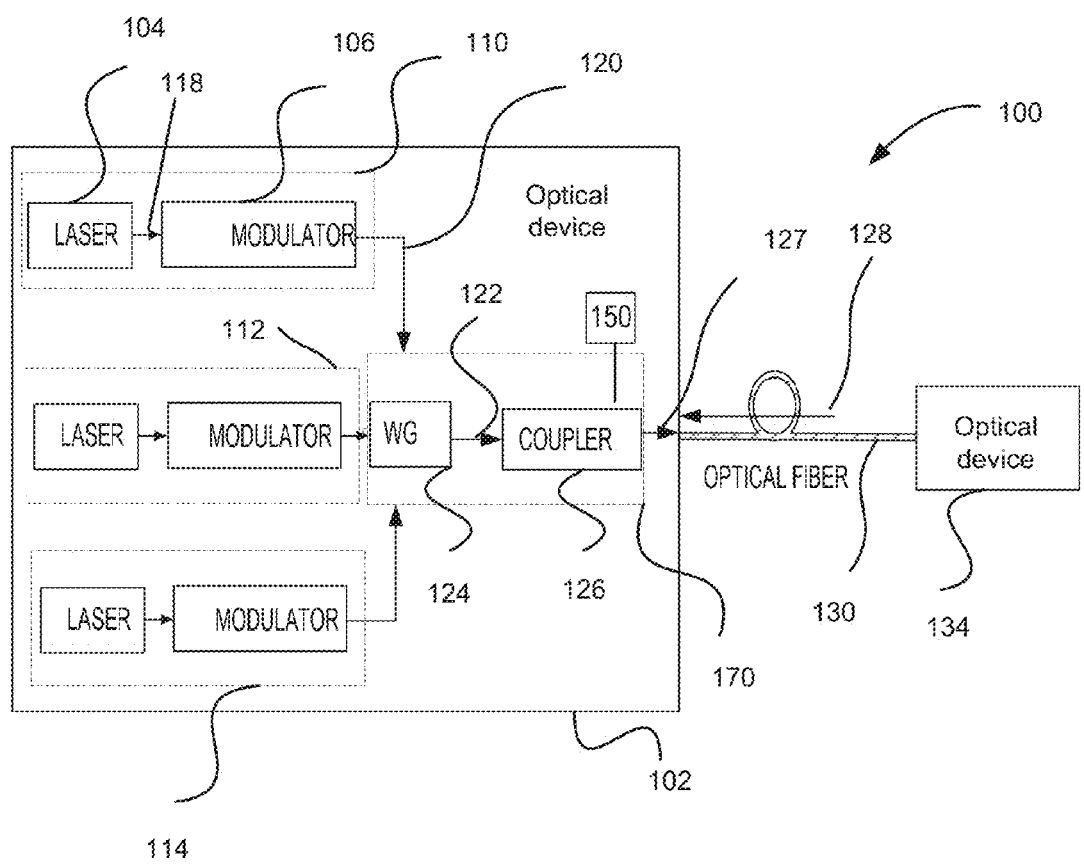
FIG. 1 is a block diagram of an optoelectronic system that may include an optical coupler configured with a mirror to reflect light as described herein, in accordance with some embodiments.

Embodiments of the present disclosure describe techniques and configurations for an optical device configured to provide vertical optical coupling with other optical devices. The device may comprise an optical waveguide to transmit light input from a light source. The optical waveguide may include a layer of an enriched dielectric material having a first end to receive the inputted light and a second end that may comprise an edge formed under an approximately 45 degree angle. The edge may interface with a layer of another dielectric material to form a linear-shaped mirror to reflect the received light substantially perpendicularly to propagate the received light. The waveguide may include a portion formed from a semiconductor material including a first region to receive the light and a second region offset from the first region and abutting the first region. The first region may have a facet that faces the dielectric portion of the optical waveguide. The facet may have a substantially non-linear shape to direct at least a portion of the light reflected back by the dielectric portion away from the optical waveguide, to reduce back-reflection. The waveguide may include a spacer coupled with the dielectric portion to output the light reflected by the mirror. The spacer may comprise a dielectric material with a numerical aperture value that is lower than a numerical aperture value of the enriched dielectric material, in order to reduce numerical aperture of the outputted light.

In another embodiment, the optical device may comprise an optical waveguide to transmit light input from a light source. The optical waveguide may include a semiconductor layer having a trench with one facet that comprises an edge formed under an approximately 45 degree angle and another facet formed substantially normal to the semiconductor layer. The edge may interface with another medium to form a mirror to receive inputted light and reflect received light substantially perpendicularly to propagate the received light. In some embodiments, that another medium may comprise air that fills the trench, and the facet comprising the edge may have a reflective material disposed on the facet. In some embodiments, that another medium may comprise the another semiconductor layer, and the mirror may be configured to provide a total internal reflection (TIR) of light directed at the mirror substantially perpendicular to the semiconductor layer.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

In various embodiments, the phrase "a first layer formed, deposited, or otherwise disposed on a second layer" may mean that the first layer is formed, deposited, grown, bonded, or otherwise disposed over the second layer, and at least a part of the first layer may be in direct contact (e.g., direct physical and/or electrical contact) or indirect contact (e.g., having one or more other layers between the first layer and the second layer) with at least a part of the second layer.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram of an optoelectronic system 100 that may include an optical coupler configured with a mirror disposed under an angle to reflect light as described herein, in accordance with some embodiments. The optoelectronic system 100 may be used to transmit an optical signal modulated with a data signal via an optical fiber, for example, between racks in a data center, or long-distance, between data storage facilities, data centers, and the like.

The optoelectronic system 100 may include an optical apparatus (device) 102 having one or more light sources (e.g., laser devices) 104 to provide a light signal 118 (e.g., constant light intensity signal) to a respective modulator 106 to modulate input light according to a data signal to be transmitted. Each combination of the light source 104 and corresponding modulator 106 may comprise a communication channel 110, 112, 114. The modulator 106 may output a modulated optical signal 120 to a multiplexer (not shown), where the signal may be input to an optical mode converter (OMC) 170 having a waveguide 124 and an optical coupler, such as a vertical optical coupler (VOC) 126. Alternatively, the signals (e.g., 120) from communication channels 110, 112, and 114 may be directly input to the OMC 170.

The OMC 170 with the coupler 126 may provide the interface from the channels 110, 112, 114 to an optical communication channel (e.g., optical fiber cable or other configuration that may include coupling optics followed by fiber) 130 and may be configured to transfer the optical signal 127 to the optical communication channel 130, to be received by another optical device 134. In embodiments, the optical waveguide 124 may comprise a silicon-on-insulator (SOI)-based optical waveguide. The optical coupler 126 having a mirror 150 may be configured to transform the light signal 122 propagating through the waveguide 124 into the signal 127 to couple with the optical communication channel 130, as described more fully below. In some embodiments, the optical coupler 126 with the mirror 150 may be configured to couple a light signal 128 input from the optical device 134 via the optical communication channel 130 into the optical device 102 via the waveguide 124.

Figure 2:
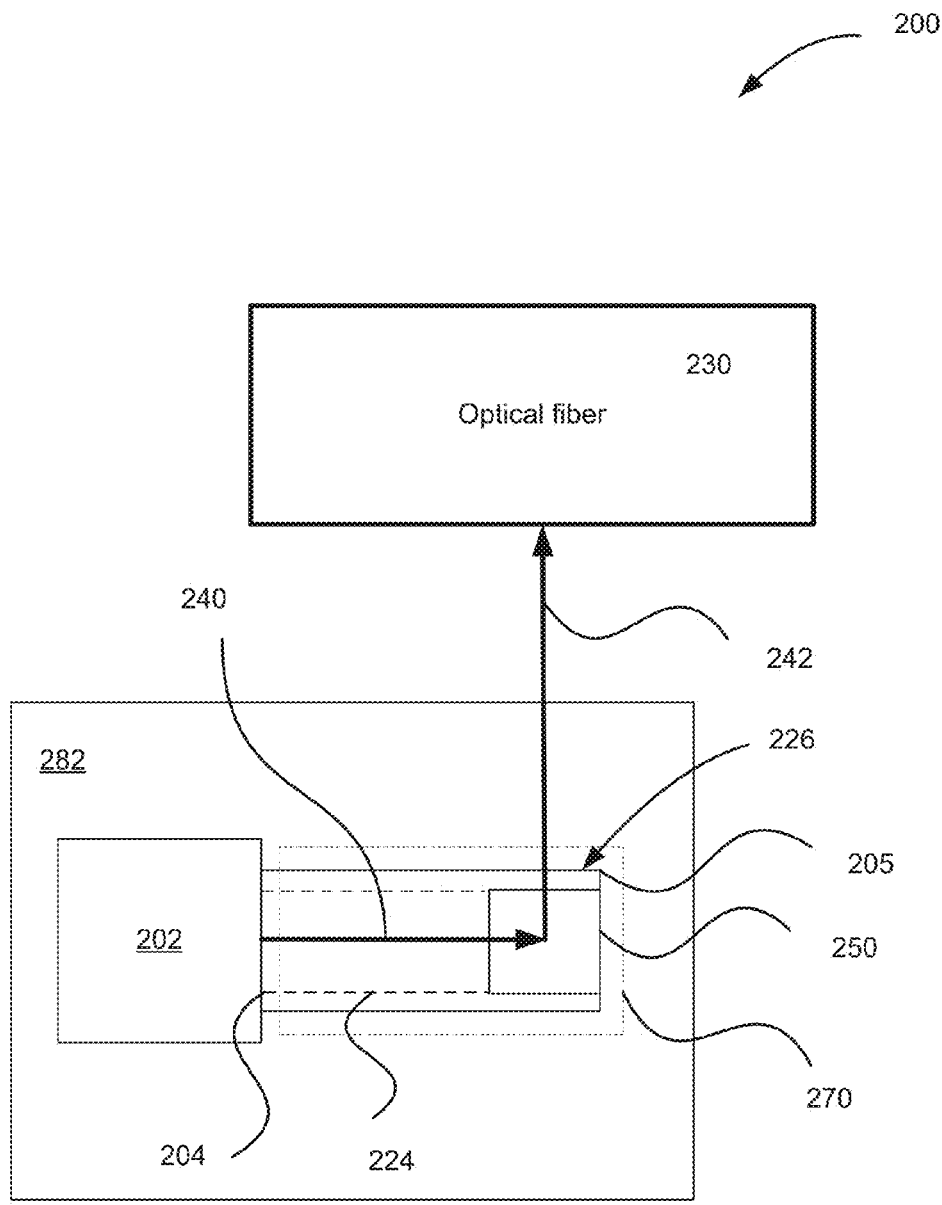
FIG. 2 is a block diagram of an example optical device depicting an optical mode converter (OMC) with an optical coupler, in accordance with some embodiments.

FIG. 2 is a block diagram 200 of an example optical device 202 (similar to device 102) depicting an optical mode converter (OMC) 270 (e.g., similar to OMC 170) with an optical coupler in greater detail, in accordance with some embodiments. As shown, the OMC 270 may include an optical coupler 226 (e.g., similar to VOC 126). In one embodiment, the optical coupler 226 may include the optical waveguide 224 with a mirror 250. The OMC 270 may be coupled to a photonics device, such as an optical device 202 (similar to device 102) at a first end 204 of the waveguide 224, according to some embodiments. The mirror 250 may be formed (e.g., cut, etched, or the like) at a determined angle (hereinafter "angled") at a second end 205 of the waveguide 224, as will be described in reference to FIG. 3. In some embodiments, the mirror 250 may be fabricated using a complementary metal-oxide-semiconductor (CMOS) process.

In some embodiments, the second end 205 of the waveguide 224 may have an angled cut with an angle greater than a critical angle to form the mirror 250, to reflect light 240 at a direction that is nearly normal to a waveguide plane using total internal reflection (TIR), as indicated by reflected light 242, to enter an optical fiber 230 (e.g., similar to optical fiber cable 130 of FIG. 1), thus exhibiting a broadband response. In some embodiments, the OMC 270 may be provided on a substrate 282, and may be included in the optical device 202 that includes the OMC 270.

Figure 3:
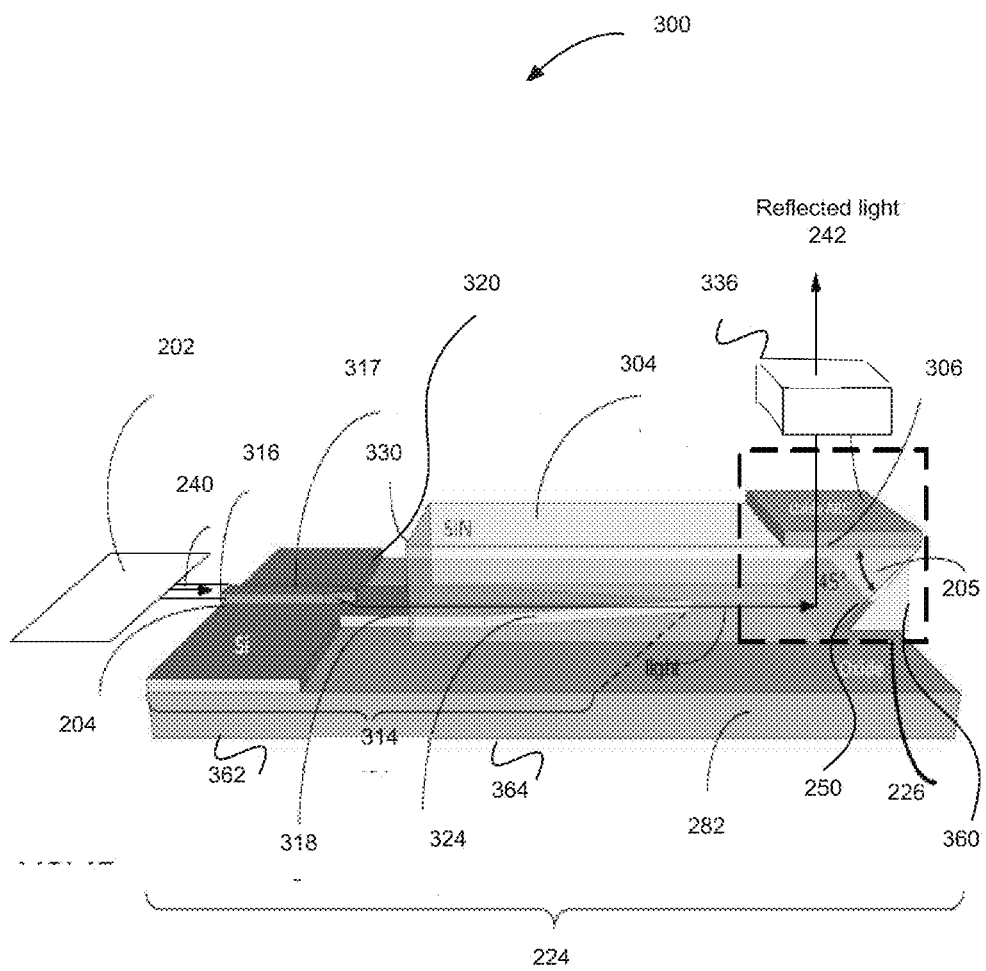
FIG. 3 is block diagram illustrating a portion of an example optical device that includes the optical mode converter with an optical coupler, in accordance with some embodiments.

FIG. 3 is block diagram illustrating a portion 300 of an example optical device 202 that includes the optical mode converter with an optical coupler, in accordance with some embodiments. The description of FIG. 3 is provided in reference to OMC 270 components denoted with like numerals in FIGS. 2 and 3.

In some embodiments, the optical waveguide 224 may include a portion 304 formed from enriched dielectric material disposed on the substrate 282. As described above, the waveguide 224 may have the first end 204 to receive the light 240 from device 202, and the second end 205 that may comprise an edge formed under an approximately 45 degree angle, forming the mirror 250. Accordingly, at least a part of the portion 304 of the waveguide 224 denoted by the dashed line may comprise the optical coupler 226.

In some embodiments, the mirror 250 may be configured to reflect light 240 perpendicularly (e.g., nearly at a right angle) to a direction of light propagation in the optical waveguide 224 by total internal reflection (TIR) between a dielectric material comprising at least the portion 304 of the waveguide 224 (including the second end 205) and another medium 360, such as another dielectric material.

In some embodiments, the dielectric material of the other medium 360 (e.g., first dielectric material) may have a refractive index that is lower than that of the dielectric material of the portion of the waveguide 224, to provide the TIR between the two dielectric materials. In some embodiments, the first dielectric material may comprise at least one of: silicon dioxide ($SiO_2$), aluminum trioxide ($Al_2O_3$), hafnium dioxide ($HfO_2$), or other dielectric material. The portion 304 of the optical waveguide 224 may be made from a second dielectric material having a refractive index in a range of 1.45 to 3.45, such as one of: silicon nitride ($Si_3N_4$), silicon oxynitride (SiON), polyimide, or epoxy-based negative photoresist SUB. In some embodiments, the dielectric material of the portion 304 may be enriched with a silicon additive such as one selected from silane ($SiH_4$), trichlorosilane ($SiHCl_3$), or tetramethylsilane ($Si(CH_3)_4$). In general, different types of materials may be used for the first and second dielectric materials that ensure TIR from the 45 degree angle cut inside the waveguide 224.

Accordingly, the mirror 250 may be formed by an interface of the second dielectric material comprising the portion of the waveguide 224 and first dielectric material comprising the other medium 360. In some embodiments, the angle of the angled cut may be greater than the TIR angle. In some embodiments, the angle of the angled cut may be approximately 45 degrees, to cause TIR between the waveguide 224 and the other medium (e.g., first dielectric material described above). This may allow for reflected light 242 incident to the cut to be approximately 100% reflected at an approximately 90 degree angle. In some embodiments, the nearly 45 degree angle cut may comprise a negative 45 degree angle cut.

The waveguide 224 may include anti-reflective coating (ARC) layer 306 deposited on a part of the waveguide 224 comprising the second end 205, as shown. The ARC layer 306 may be deposited on the waveguide 224 to reduce reflection of the light being output from the mirror 250. In some embodiments, the ARC layer 306 may be an oxide-ARC layer. In such an embodiment, the ARC layer 306 may comprise a thin layer of oxide deposited at the top surface of the waveguide 224. The ARC layer 306 may reduce optical losses (including return loss) due to Fresnel reflection at the interface of the waveguide 224 with another medium. In other embodiments, other materials may be used for the ARC layer 306 to cancel and/or reduce any reflection of light from the 45 degree mirror 250 as light leaves the waveguide 224 at an angle approximately normal to the light propagation direction in the waveguide 224. In some embodiments, the waveguide 224 may further include a spacer 336 at least partially disposed on top of the ARC layer 306. The spacer 336 may be offset from the portion 304 by a determined distance, as described in greater detail in reference to FIG. 4.

As briefly discussed above, the waveguide 224 may include another waveguide, which may be a semiconductor waveguide with upper (first) 362 and lower (second) 364 regions. In some embodiments, the lower region of the semiconductor waveguide may be coupled with the portion 304, while the upper region of the semiconductor waveguide may receive light from the photonics device 202 and push the received light down to the lower region.

Accordingly, the waveguide 224 may include a portion 314 to receive light 240 from a light source (e.g., device 202), wherein the portion 314 may be formed from a semiconductor material (e.g., silicon) and coupled with the portion 304 around the first end 204. The portion 314 may include a first region 316 to receive the light, and a second region 318 coupled with the first region 316 to receive light from the first region 316 and to provide the received light to the portion 304. The second region 318 may be offset from the first region 316 and abut the first region 316, as shown.

The first region 316 may include at least one semiconductor layer 317 (e.g., silicon). The layer 317 may have at least one facet 320 that faces an end 330 of the portion 304 of the optical waveguide 224. In some embodiments, the facet 320 may have a substantially non-linear shape to direct at least a portion of light reflected back by the facet 320 away from the optical waveguide 224, to reduce return loss of the received light. The example configuration of the layer 317 with facet 320 is described in greater detail in reference to FIG. 5.

In some embodiments, the second region 318 of the waveguide 224 may include an inverted tapered end 324 in the direction of light propagation to output the received light, wherein the inverted tapered end 324 of the waveguide 224 may be positioned inside the portion 304 around the first end 204. One purpose of such positioning the inverted tapered end 324 may be to channel light to the portion 304 from the device 202 with desired light loss.

In some embodiments, the first region 316 may have a length (in the direction of light propagation) shorter than a length (in the direction of light propagation) of the second region 318. In other embodiments, the first region 316 may have the length (in the direction of light propagation) that is equal to or greater than the length of the second region 318.

As known, the numerical aperture of light output by an optical device such as device 202 may be dependent on the waveguide 224 geometry. The numerical aperture of the output light may be related to the thickness of the portion 304 of the waveguide 224 comprising the second dielectric material enriched as described above. In some embodiments, the thickness of the portion 304 of the waveguide 224 may comprise about 4 micrometers, which may allow the numerical aperture to be reduced (e.g., to about 0.35).

The numerical aperture may also be dependent on a shape of a surface of the mirror 250. A linear surface of the mirror 250 may contribute to lowering the numerical aperture of output light. Linearizing the mirror surface may bring the numerical aperture to about 0.3.

In some embodiments, the numerical aperture may be further reduced by integrating a spacer, such as spacer 336, with the waveguide 224, as briefly described in reference to FIG. 3. In some embodiments, the spacer may comprise a third dielectric material (e.g., oxide) with a refractive index value that is lower than the refractive index value of the portion 304 of the waveguide 224.

Figure 4:
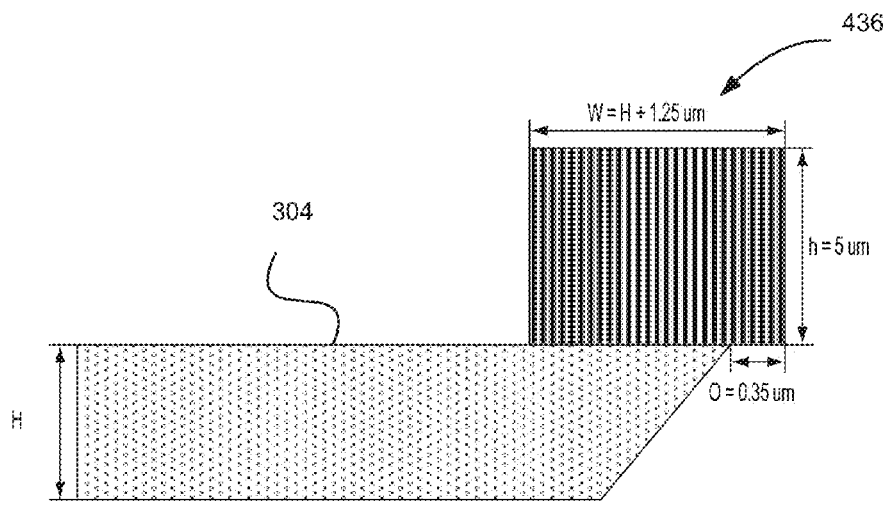
FIG. 4 illustrates an example spacer coupled to an optical coupler, in accordance with some embodiments.

FIG. 4 illustrates an example spacer 436 (similar to spacer 336 of FIG. 3) coupled to an optical coupler, such as coupler 226, in accordance with some embodiments. The geometry (e.g., height and width) and spatial location of the spacer 436 relative to the portion 304 may be provided such as to reduce the numerical aperture to about 0.2. For example, the spacer 436 may be partially disposed (e.g., butt-coupled) on the portion 304 and offset from the portion 304 by a distance 0 ranging from 0 to 0.6 micrometers. The height h of the spacer 436 may be about 5 micrometers, and the width W of the spacer 436 may correspond to the height H of the portion 304, which may be about 2.5 micrometers. Accordingly, the width W of the spacer 436 may range from H+0.5 to H+1.75 micrometers. In the example illustrated in FIG. 4, the offset O of the spacer 436 is 0.35 micrometers, height h is 5 micrometers, and width W is H+1.25 micrometers. In general, the geometric parameters of the spacer 436 and its placement relative to the portion 304 may have different values, whose combination may provide a reduction of the numerical aperture.

Referring again to FIG. 3, at least a portion of light 240 directed into the waveguide 224 may be reflected back by the facet 320 of the waveguide 224. In some embodiments, the back-reflected light may affect the stability of the light source. In order to reduce back-reflection of light by the waveguide 224, the waveguide 224 may be configured to direct at least a portion of the reflected light away from the waveguide. For example, as briefly described in reference to FIG. 3, the facet 320 of the semiconductor layer 317 of the waveguide 224 that faces an end 330 of the portion 304 of the optical waveguide 224 may be configured to reflect the light away from the waveguide 224.

Figure 5:
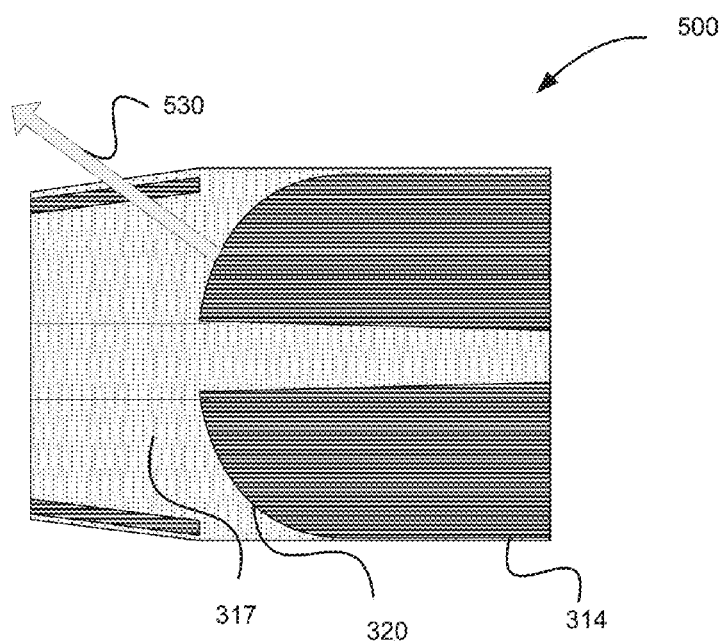
FIG. 5 illustrates a top view of an example embodiment of a portion of the waveguide of the optical device of FIG. 3, in accordance with some embodiments.

FIG. 5 illustrates a top view 500 of an example embodiment of a portion 314 of the waveguide 224, in accordance with some embodiments. As described earlier, the portion 314 includes the layer 317 having one or more (e.g., two) facets 320. In some embodiments, the facet 320 may have a substantially non-linear (e.g., curved or rounded) shape to direct at least a portion of light 530 reflected back by the facet 320 away from the optical waveguide 224, to reduce return loss of the received light.

Referring back to FIG. 3, a desired mechanical stability of the mirror 250 may be provided by interfacing the end 205 of the portion 304 with another medium 360, which may be a dielectric material, as opposed to a conventional interface of a dielectric and air that may provide TIR for a mirror formed by such an interface. Accordingly, the refractive index of the dielectric material comprising the portion 304 of the waveguide 224 (second dielectric material) may be increased relative to that of the first dielectric material comprising the medium 360, to ensure TIR effect. In some embodiments, the second dielectric material may be enriched to increase its refractive index. As described above, the second dielectric material may be enriched with a silicon additive such as one selected from silane ($SiH_4$), trichlorosilane ($SiHCl_3$), tetramethylsilane ($Si(CH_3)_4$), or another enriched dielectric material. Enriching the second dielectric material may bring the refractive index of the material to 2.6, which may ensure the TIR condition for the mirror 250 provided by the interface of the first and second dielectric materials, e.g., silicon-rich nitride-oxide interface, in some embodiments.

Optical couplers with angled reflective mirrors described herein may be employed in a number of different optical devices. In addition or in the alternative to embodiments described above, vertical coupling configuration similar to one described above may be used for coupling light in and out of SOI waveguides with a thickness around 4 micrometers to 30 micrometers. Vertical coupling may be used to enable wafer level testing, which is a key requirement for high volume manufacturing.

FIGS. 6-17 schematically illustrate cross-section side views of example optical couplers having angled reflective mirrors showing different stages of forming the structure of the optical couplers, in accordance with some embodiments. More specifically, FIGS. 6-17 illustrate the example fabrication operations adapted to form the structure of the optical couplers, in accordance with some embodiments. For simplicity purposes, the structure components (e.g., layers of the structure) of the optical coupler that appear in multiple figures will be described and numbered in the first figure in which they appear and will be referenced in subsequent figures.

Figure 6:
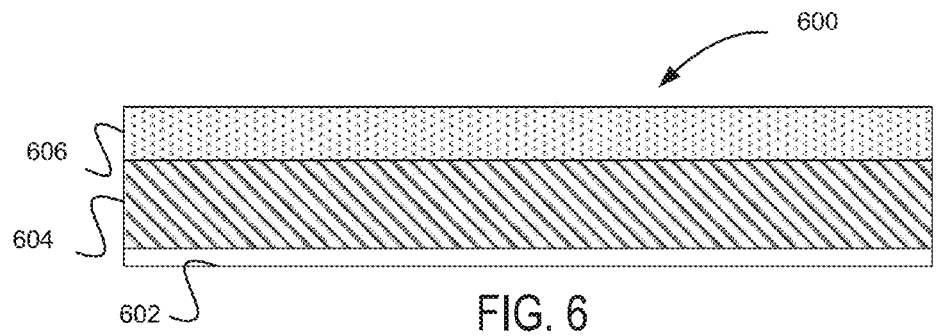
FIGS. 6-17 schematically illustrate cross-section side views of example optical couplers having angled reflective mirrors showing different stages of forming the structure of the optical couplers, in accordance with some embodiments.

FIGS. 6-12 illustrate an example optical coupler, in accordance with some embodiments. Referring to FIG. 6, an optical coupler 600 is depicted subsequent to providing an SOI wafer comprising a buried oxide (BOX) layer 602, a semiconductor layer (e.g., an epitaxial silicon layer) 604, and an inter-dielectric layer (IDL) 606 cladding on top of the semiconductor layer 604. In some embodiments, the BOX layer 602 may be disposed on a substrate (not shown for simplicity purposes).

Figure 7:
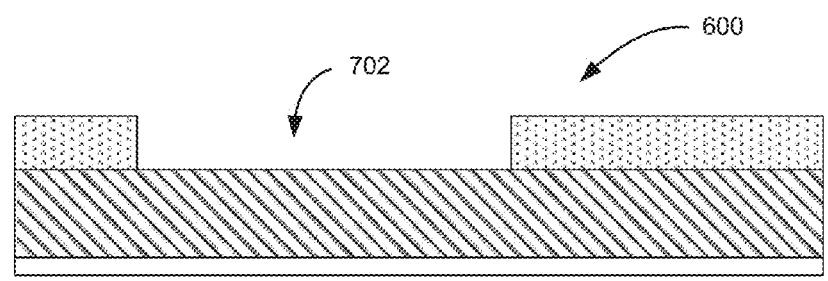

In FIG. 7, the optical coupler 600 is depicted subsequent to providing an opening 702 in the IDL 606, e.g., via lithography and dry etching.

Figure 8:
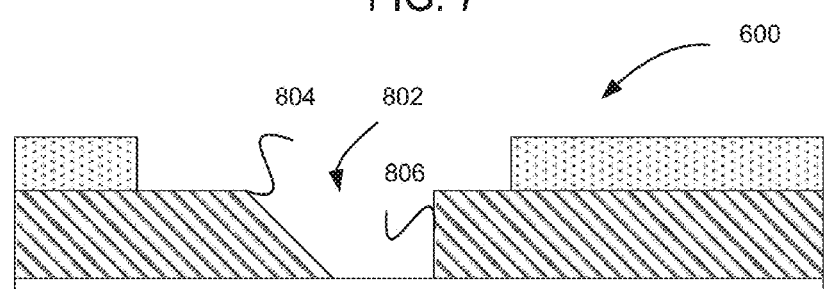

In FIG. 8, the optical coupler 600 is depicted subsequent to providing a trench 802 extending through the IDL 606 into the semiconductor layer 604. The trench may have one facet 804 that comprises an edge formed under an approximately 45 degree angle in order to couple light that may be input into the SOI waveguide substantially perpendicular to a plane of the layers 602, 604, 606. Another facet 806 may be formed substantially normal to the semiconductor layer 604. The edge may be defined, e.g., by grayscale lithography and dry etching.

Figure 9:
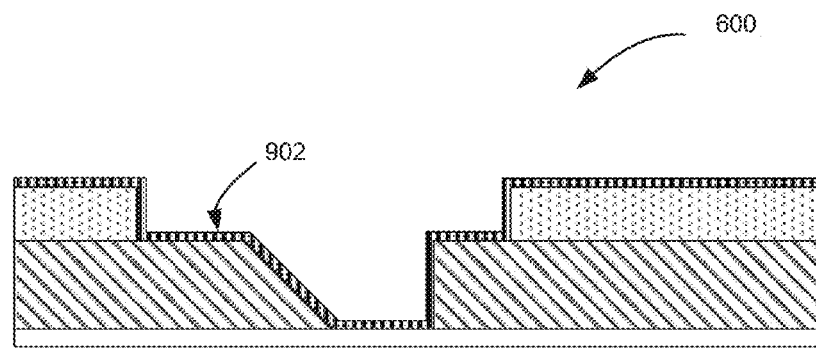

In FIG. 9, the optical coupler 600 is depicted subsequent to disposing anti-reflection coating (ARC) 902 inside the trench 802, at least on the facet 804 comprising the edge described in reference to FIG. 8. More specifically, SiN or SiON, which serves as ARC, may be blanketly disposed on the facet 804.

Figure 10:
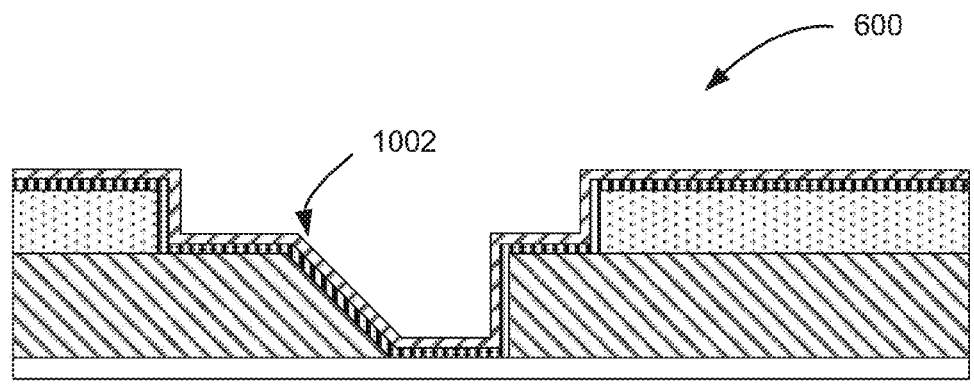

In FIG. 10, the optical coupler 600 is depicted subsequent to disposing reflective material 1002 at least on the one facet 804 comprising the edge described in reference to FIG. 8, on top of the ARC 902. For example, a blanked deposition of aluminum (Al) or other reflective material, which serves as a highly reflective coating (HRC), may be provided on the facet 804, as shown.

Figure 11:
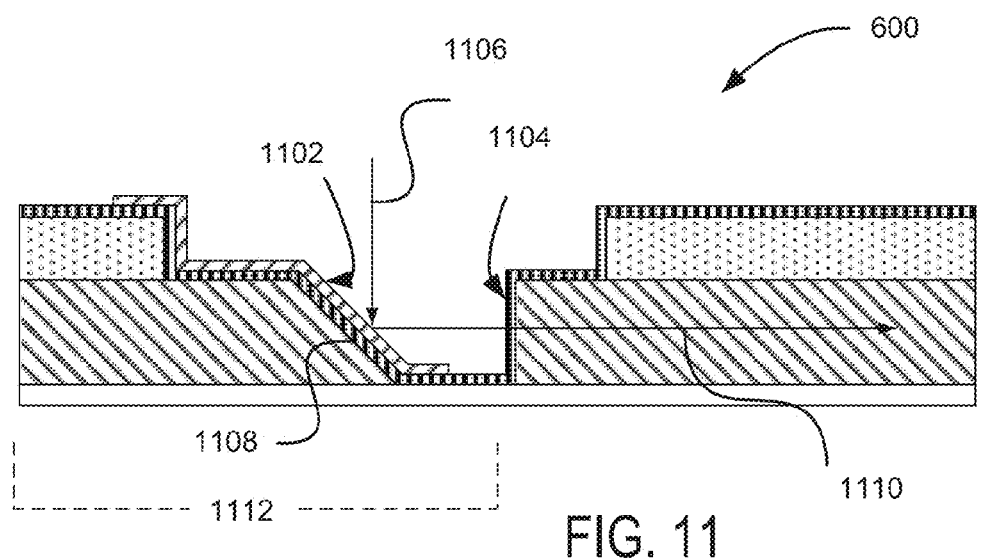

In FIG. 11, the optical coupler 600 is depicted subsequent to etching (e.g., wet etching) the reflective material 1002 to define an HRC region 1102 on facet 804 and to expose an ARC region 1104 on facet 806. Now a vertical coupling configuration may be enabled. For example, light 1106 directed at a mirror 1108 formed by an interface of the HRC region 1102 and air filling the trench 802 may be received and reflected by the mirror 1108 substantially perpendicularly to propagate the received light 1106 as reflected light 1110, as shown, along an optical waveguide coupled to the optical coupler 600.

Figure 12:
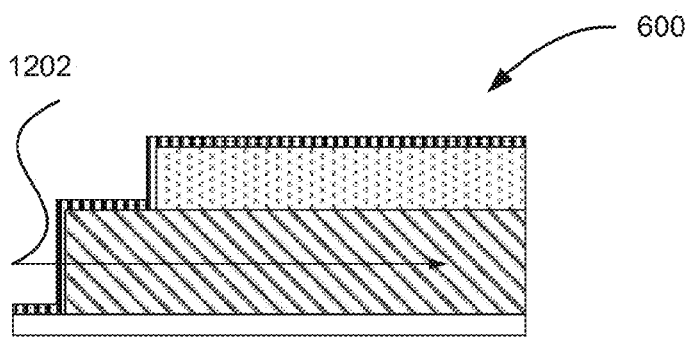

In some embodiments, further steps may be taken to provide horizontal coupling using the optical coupler 600. In FIG. 12, the optical coupler 600 is depicted subsequent to dicing a portion 1112 of wafer (shown in FIG. 11) comprising the structure of the optical coupler 600, leaving intact the ARC region 1104. Accordingly, horizontal coupling may be enabled, whereby the light directed substantially parallel to the layers of the optical coupler 600 may propagate along the waveguide as indicated by arrow 1202.

FIGS. 13-17 illustrate another example optical coupler, in accordance with some embodiments.

Figure 13:
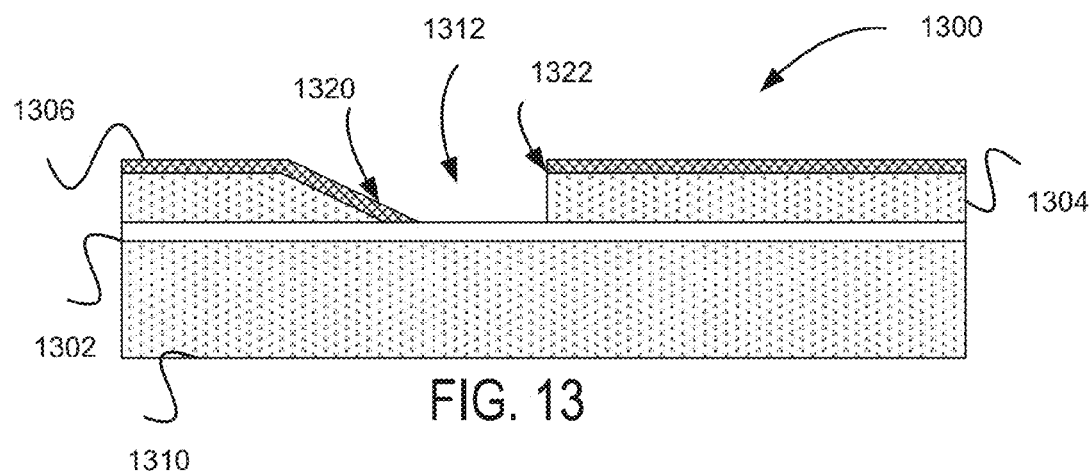

Referring to FIG. 13, an optical coupler 1300 is depicted subsequent to providing an SOI wafer comprising a buried oxide (BOX) layer 1302, a semiconductor layer (e.g., an epitaxial silicon layer) 1304, and a dielectric coating (e.g., silicon oxide layer) 1306 on top of the semiconductor layer 1304. In some embodiments, the BOX layer 1302 may be disposed above a substrate 1310. As shown, a trench 1312 similar to one described in reference to FIGS. 6-12 may be provided, extending into the semiconductor layer 1304. More specifically, a facet 1320 that comprises an edge formed under an approximately 45 degree angle may be etched, and another facet 1322 may be formed substantially normal to the semiconductor layer 1304. The edge forming the facet 1320 may interface another medium to form a mirror to receive inputted light input into the optical apparatus and reflect received light substantially perpendicularly to propagate the received light.

The optical coupler 1300 depicted in FIG. 13 may be provided similarly to an embodiment of the optical coupler 600 depicted in FIG. 10, except instead of the reflecting material, the dielectric coating 1306 may be provided, to cover at least partially the trench 1312.

Figure 14:
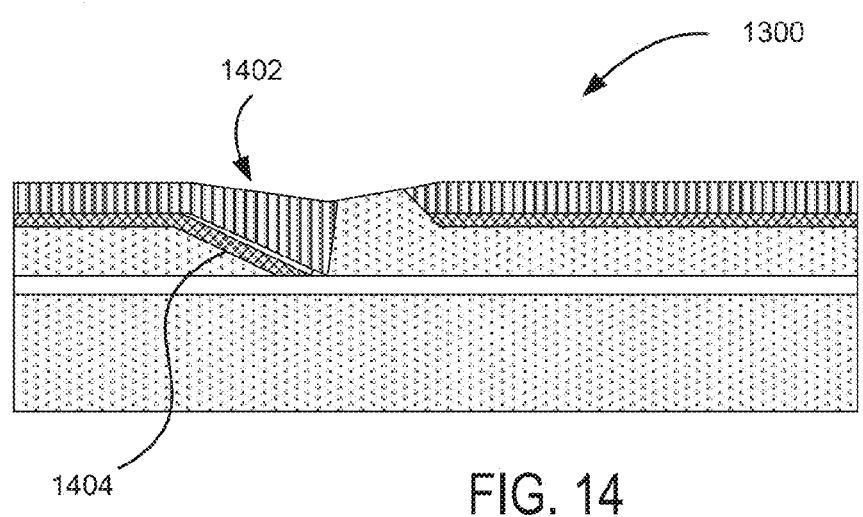

In FIG. 14, the optical coupler 1300 is depicted subsequent to another semiconductor layer 1402 disposed on top of the dielectric coating 1306 to fill the trench. In some embodiments, the semiconductor layer 1402 (e.g., polycrystalline silicon) may be epitaxially grown on top of the dielectric coating 1306. For example, silane may be used as a seeding layer and temperature growth may be used to epitaxially grow the semiconductor layer. As a result, a mirror 1404 may be formed by an interface of the dielectric coating 1306 disposed on the angled facet 1320 and the semiconductor layer disposed on top of the dielectric coating 1306. The formed mirror 1404 may provide a total internal reflection of light directed at the mirror 1404 substantially perpendicular to the semiconductor layer 1304.

Figure 15:
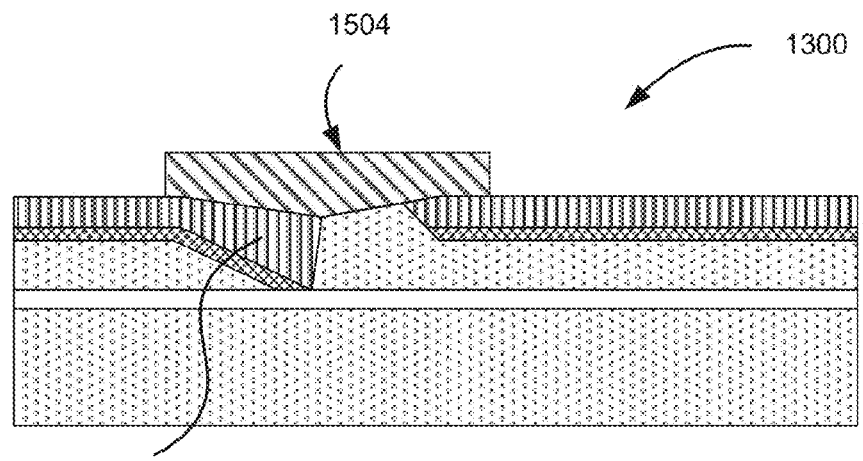

In FIG. 15, the optical coupler 1300 is depicted subsequent to providing protection for a region 1502 including the mirror 1404 inside the trench 1312. For example, lithography may be used to pattern a film or other coating 1504 on top of the region 1502 including the mirror 1404 inside the trench 1312.

Figure 16:
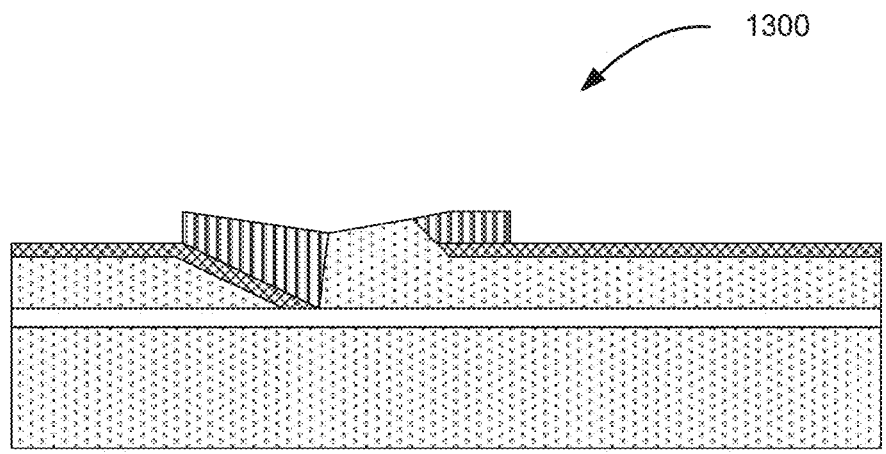

In FIG. 16, the optical coupler 1300 is depicted subsequent to etching (e.g., dry etching) the coating 1504 and the semiconductor layer 1304 to remove excess semiconductor layer 1402 (e.g., polycrystalline silicon).

Figure 17:
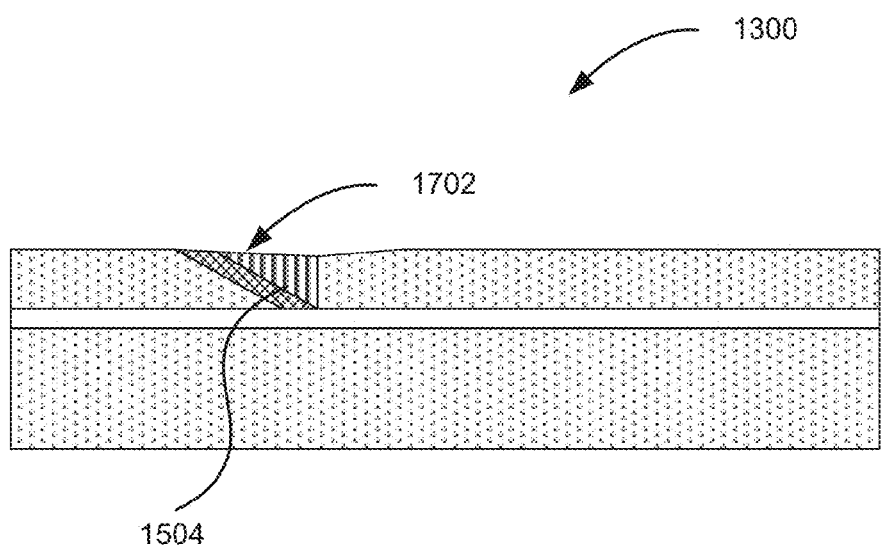

In FIG. 17, the optical coupler 1300 is depicted subsequent to providing the finish, e.g, smoothing a surface 1702 around the region 1502. For example, chemical mechanical polishing (CMP) may be used to smooth the surface 1702 of the region 1502.

The operations described in reference to FIGS. 15-17 may be optional. The purpose of the operations may be to provide an interface of the dielectric coating with the semiconductor layer. Accordingly, the operations of FIGS. 15-17 may be substituted or added to by polishing the surface 1702 around the region 1502 or other similar operation.

As a result of the operations described in reference to FIGS. 13-17, a mirror may be formed by the edge comprising a dielectric coating that interfaces with another medium, a semiconductor layer, to receive inputted light and reflect received light substantially perpendicularly to propagate the received light. The angled mirror formed by the operations described above may provide a total internal reflection (TIR) of light directed at the mirror substantially perpendicular to the semiconductor layer.

An embodiment of the optical coupler 1300 described above may provide for optical loss at a desired level because the light directed at the coupler may be traveling within a confined waveguide structure instead of the free space (provided by air as an interface medium in the embodiment described in reference to FIGS. 6-12). The tolerance to misalignment may also be provided at a desired level due to the total internal reflection (TIR) structure provided by the mirror. Also, subsequent procedures related to providing a structure (e.g., on-chip structure) of the optical device with the optical coupler as described, including semiconductor processes and packaging processes, may be simplified because of smoothing the surface of the device to an approximately flat state.

Figure 18:
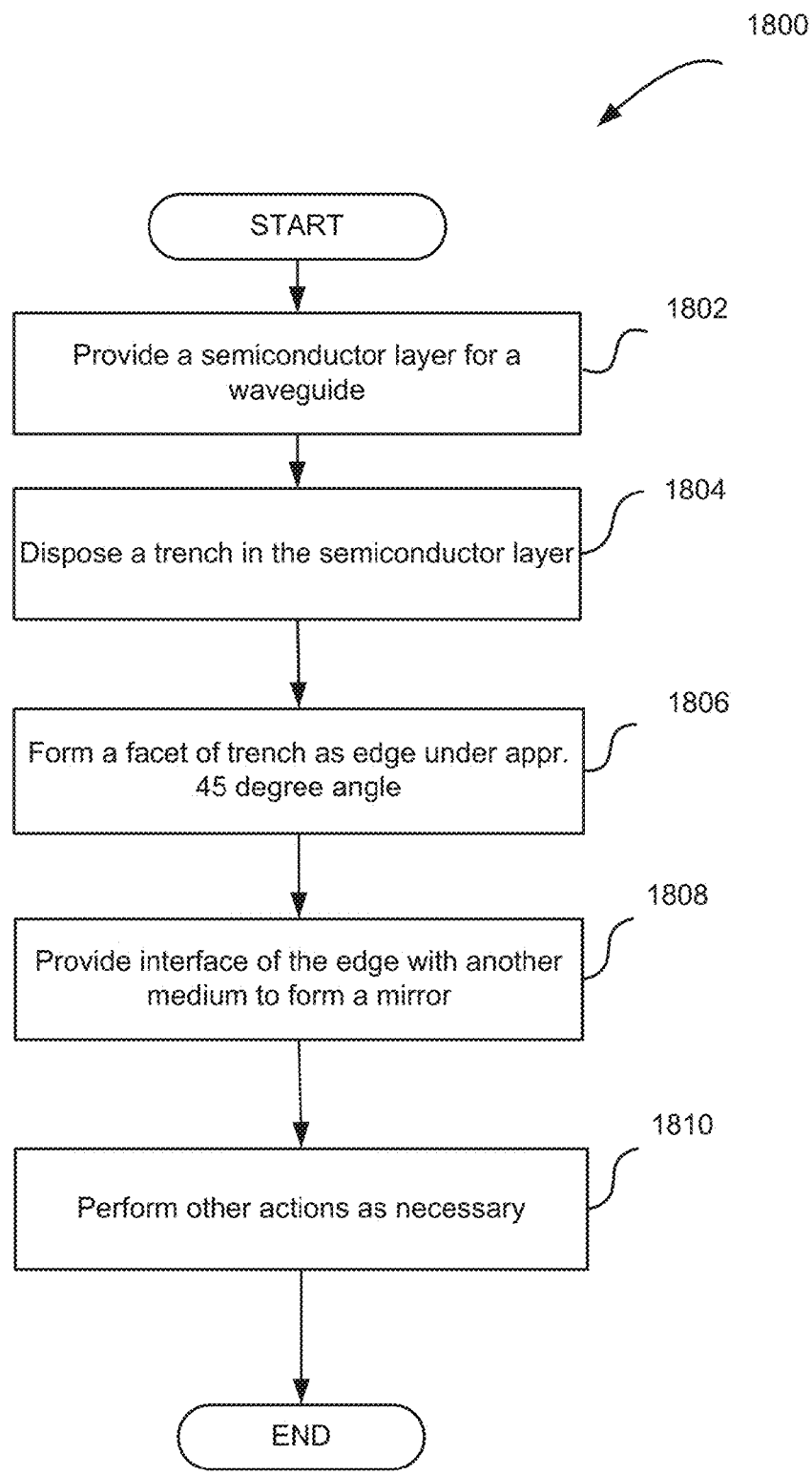
FIG. 18 schematically illustrates a flow diagram for a process of fabricating an optical coupler described in reference to FIGS. 6-17, in accordance with some embodiments.

FIG. 18 schematically illustrates a flow diagram for a process 1800 of fabricating an optical coupler described in reference to FIGS. 6-17, in accordance with some embodiments. The process 1800 may comport with actions described in connection with FIGS. 6-17 in some embodiments.

At 1802, the process 1800 may include providing a semiconductor layer for an optical waveguide of an optical apparatus, to form an optical coupler. Prior to 1802, the process 1800 may include providing a substrate, depositing a buried oxide (BOX) layer above the substrate, and depositing the semiconductor layer on the BOX layer. In some embodiments, an inter-dielectric layer may be deposited above the semiconductor layer. The actions of 1802 may correspond to actions described in reference to FIGS. 6 and/or 13.

At 1804, the process 1800 may further include disposing a trench in the semiconductor layer, similar to the actions described in reference to FIGS. 7, 8, and/or 13.

At 1806, the process 1800 may further include forming a facet of trench as an edge under an approximately 45 degree angle, similar to the actions described in reference to FIGS. 8 and 13.

At 1808, the process 1800 may further include providing an interface of the edge with another medium to form an angled mirror, as described in reference to FIGS. 9-11 and/or 13.

At 1810, the process 1800 may further include optionally, alternatively, or additionally to the actions performed at 1802-1808, performing other actions as necessary. For example, the actions may include actions described in reference to FIGS. 9-12 and/or 14-17.

Various operations are described as multiple discrete operations in turn, in a manner that is most helpful in understanding the claimed subject matter. However, the order of description should not be construed as to imply that these operations are necessarily order dependent. Embodiments of the present disclosure may be implemented into a system using any suitable hardware and/or software to configure as desired.

Figure 19:
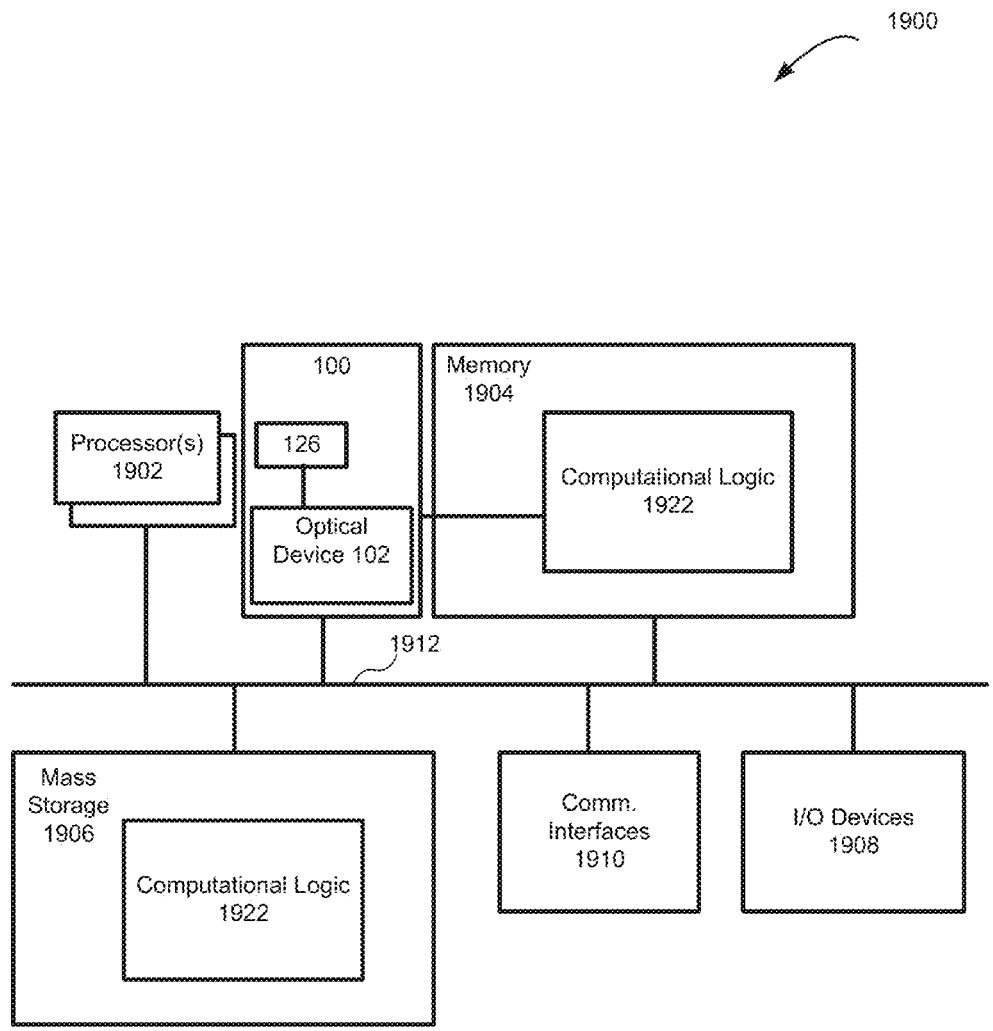
FIG. 19 schematically illustrates an example computing device including an optical device with an optical coupler, in accordance with some embodiments.

FIG. 19 illustrates an example computing device 1900 suitable for use with various components of FIG. 1, such as optoelectronic system 100 including optical device 102 having optical coupler 126 with mirror 150 of FIG. 1, in accordance with various embodiments. As shown, computing device 1900 may include one or more processors or processor cores 1902 and system memory 1904. For the purpose of this application, including the claims, the terms "processor" and "processor cores" may be considered synonymous, unless the context clearly requires otherwise. The processor 1902 may include any type of processors, such as a central processing unit (CPU), a microprocessor, and the like. The processor 1902 may be implemented as an integrated circuit having multi-cores, e.g., a multi-core microprocessor. The computing device 1900 may include mass storage devices 1906 (such as diskette, hard drive, volatile memory (e.g., dynamic random-access memory (DRAM), compact disc read-only memory (CD-ROM), digital versatile disk (DVD), and so forth). In general, system memory 1904 and/or mass storage devices 1906 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

The computing device 1900 may further include input/output devices 1908 (such as a display (e.g., a touchscreen display), keyboard, cursor control, remote control, gaming controller, image capture device, and so forth) and communication interfaces 1910 (such as network interface cards, modems, infrared receivers, radio receivers (e.g., Bluetooth), and so forth).

The communication interfaces 1910 may include communication chips (not shown) that may be configured to operate the device 1900 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1910 may operate in accordance with other wireless protocols in other embodiments.

The above-described computing device 1900 elements may be coupled to each other via system bus 1912, which may represent one or more buses. In the case of multiple buses, they may be bridged by one or more bus bridges (not shown). Each of these elements may perform its conventional functions known in the art. In particular, system memory 1904 and mass storage devices 1906 may be employed to store a working copy and a permanent copy of the programming instructions for the operation of various components of computer system 1900, including but not limited to the operation of the optical device 102 of FIG. 1, an operating system of computer system 1900, and/or one or more applications. The various elements may be implemented by assembler instructions supported by processor(s) 1902 or high-level languages that may be compiled into such instructions.

The permanent copy of the programming instructions may be placed into mass storage devices 1906 in the factory, or in the field, through, for example, a distribution medium (not shown), such as a compact disc (CD), or through communication interface 1910 (from a distribution server (not shown)). That is, one or more distribution media having an implementation of the agent program may be employed to distribute the agent and to program various computing devices.

The number, capability, and/or capacity of the elements 1908, 1910, 1912 may vary, depending on whether computing device 1900 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 1904 may include computational logic 1922 configured to practice aspects of embodiments, such as those involving optical device 102 and optical coupler 126, as described in reference to FIGS. 1-18. For some embodiments, at least one of processors 1902 may be packaged together with computational logic 1922 configured to practice aspects of embodiments described herein to form a System in Package (SiP) or a System on Chip (SoC).

The computing device 1900 may include or otherwise associate with an optoelectronic system, such as system 100, implementing aspects of the optical device 102, including the optical coupler 126 (226) as described above, and in particular the embodiments of the optical coupler described in reference to FIGS. 2-18. In some embodiments, at least some components of the optoelectronic system 100 (e.g., optical device 102) may be communicatively coupled with the computing device 1900 and/or be included in one or more of the computing device 1900 components, such as communication interfaces 1910, for example.

In various implementations, the computing device 1900 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 1900 may be any other electronic device that processes data.

According to various embodiments, the present disclosure describes a number of examples. Example 1 is an optical apparatus comprising: an optical waveguide to transmit light input from a light source, wherein the optical waveguide includes a layer of first dielectric material and first and second portions, wherein the first portion is to receive the light from the light source, and the second portion is formed from a second dielectric material having a first end to receive the inputted light and a second end that comprises an edge formed under an approximately 45 degree angle, wherein the edge interfaces with the layer of first dielectric material to form a mirror to reflect the received light substantially perpendicularly to propagate the received light.

Example 2 may include the subject matter of Example 1, and further specifies that the first portion is formed from a semiconductor material and coupled with the second portion at the first end of the first portion, wherein the first portion includes: a first region to receive the light; and a second region coupled with the first region to receive the light from the first region for the first portion, wherein the second region is offset from the first region and abuts the first region; wherein the first region has at least one facet that faces the second portion of the optical waveguide, wherein the facet has a substantially non-linear shape to direct at least a portion of the light reflected back by the second portion away from the optical waveguide.

Example 3 may include the subject matter of Example 2, and further specifies that the non-linear shape comprises a substantially curved shape.

Example 4 may include the subject matter of Example 1, and further specifies that the formed mirror comprises a substantially linear surface.

Example 5 may include the subject matter of Example 1, and further specifies that the second portion is formed from a layer of the second dielectric material with a thickness of approximately 2.5 micrometers.

Example 6 may include the subject matter of Example 1, and further specifies that the optical apparatus further comprises a spacer coupled with the second portion to output the light reflected by the mirror, wherein the spacer comprises a third dielectric material with a first numerical aperture value that is lower than a second numerical aperture value of the second portion.

Example 7 may include the subject matter of Example 6, and further specifies that the spacer is partially disposed on the second portion and offset from the second portion by a distance from 0 to 0.6 micrometers.

Example 8 may include the subject matter of Example 7, and further specifies that the spacer has a height of about 5.0 micrometers and a width corresponding to a thickness of the second dielectric material.

Example 9 may include the subject matter of Example 1, and further specifies that the second dielectric material comprises one of silicon nitride ($Si_3N_4$), silicon oxynitride (SiON), or polyimide, enriched with a silicon additive, wherein the additive is selected from one of: silane ($SiH_4$), trichlorosilane ($SiHCl_3$) or tetramethylsilane ($Si(CH_3)_4$).

Example 10 may include the subject matter of Example 1, and further specifies that the first portion comprises a semiconductor material.

Example 11 may include the subject matter of any of Examples 1 to 10, and further specifies that the first dielectric material is selected from at least one of: silicon dioxide ($SiO_2$), aluminum trioxide ($Al_2O_3$), or hafnium dioxide ($HfO_2$).

Example 12 may include the subject matter of any of Examples 1 to 10, and further specifies that the mirror formed by an interface of the first and second dielectric materials is to provide total internal reflection (TIR) of the reflected light.

Example 13 may include the subject matter of Example 1, and further specifies that the light source is optically coupled with the apparatus and comprises a laser.

Example 14 is an optical apparatus comprising: an optical waveguide to transmit light input from a light source, wherein the optical waveguide includes a semiconductor layer, having a trench with one facet that comprises an edge formed under an approximately 45 degree angle and another facet formed substantially normal to the semiconductor layer, wherein the edge interfaces with another medium to form a mirror to receive inputted light and reflect received light substantially perpendicularly to propagate the received light.

Example 15 may include the subject matter of Example 14, and further specifies that the optical apparatus further comprises: a substrate; a buried oxide (BOX) layer disposed above the substrate, wherein the semiconductor layer is disposed on the BOX layer; and an inter-dielectric layer disposed above the semiconductor layer; wherein the trench extends through the inter-dielectric layer into the semiconductor layer.

Example 16 may include the subject matter of Example 15, and further specifies that another medium comprises air that fills the trench, wherein the optical apparatus further comprises a reflective material disposed at least on the one facet comprising the edge.

Example 17 may include the subject matter of Example 16, and further specifies that the apparatus further comprises an anti-reflection coating disposed at least inside the trench, wherein the reflective material is disposed on top of the anti-reflection coating.

Example 18 may include the subject matter of Example 15, and further specifies that the optical apparatus further comprises: a dielectric coating disposed at least inside the trench; and another semiconductor layer disposed on top of the dielectric coating to fill the trench; wherein the another medium comprises the another semiconductor layer, and wherein the formed mirror is to provide a total internal reflection (TIR) of light directed at the mirror substantially perpendicular to the semiconductor layer.

Example 19 may include the subject matter of Example 18, and further specifies that the semiconductor layer comprises silicon (Si) and the another semiconductor layer comprises polycrystalline silicon.

Example 20 is a method of forming an optical waveguide of an optical apparatus, comprising: providing a semiconductor layer for the optical waveguide; and disposing a trench inside the semiconductor layer, the disposing including etching one facet that comprises an edge formed under an approximately 45 degree angle and another facet formed substantially normal to the semiconductor layer, the edge interfacing another medium to form a mirror to receive inputted light input into the optical apparatus and reflect received light substantially perpendicularly to propagate the received light.

Example 21 may include the subject matter of Example 20, and further specifies that the method further comprises: prior to providing a semiconductor layer, providing a substrate; and depositing a buried oxide (BOX) layer above the substrate, wherein the semiconductor layer is provided on the BOX layer.

Example 22 may include the subject matter of Example 21, and further specifies that disposing a trench further includes: depositing an inter-dielectric layer above the semiconductor layer; and etching the inter-dielectric layer to dispose the trench in the semiconductor layer.

Example 23 may include the subject matter of Example 22, and further specifies that the method may further comprise disposing anti-reflection coating inside the trench; and depositing a reflecting material on the facet comprising the edge, on top of the anti-reflection coating, wherein the another medium comprises air filling the trench.

Example 24 may include the subject matter of Example 21, and further specifies that the method may further comprise disposing a dielectric coating inside the trench; and depositing another semiconductor layer on top of the dielectric coating to fill the trench.

Example 25 may include the subject matter of Example 24, and further specifies that another medium comprises another semiconductor layer, and the formed mirror is to provide a total internal reflection (TIR) of light directed at the mirror.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. An optical apparatus comprising:
   a substrate;
   a buried oxide (BOX) layer disposed above the substrate;
   an inter-dielectric layer disposed above a semiconductor layer; and
   an optical waveguide to transmit light input from a light source, wherein the optical waveguide includes the semiconductor layer, having a trench with one facet that comprises an edge formed under an approximately 45 degree angle and another facet formed substantially normal to the semiconductor layer, wherein the edge interfaces with another medium to form a mirror to receive inputted light and reflect received light substantially perpendicularly to propagate the received light, wherein the semiconductor layer is disposed on the BOX layer, and wherein the trench extends through the inter-dielectric layer into the semiconductor layer.

2. The optical apparatus of claim 1, wherein the another medium comprises air that fills the trench, wherein the optical apparatus further comprises a reflective material disposed at least on the one facet comprising the edge.

3. The optical apparatus of claim 2, wherein the apparatus further comprises an anti-reflection coating disposed at least inside the trench, wherein the reflective material is disposed on top of the anti-reflection coating.

4. The optical apparatus of claim 1, further comprising:
   a dielectric coating disposed at least inside the trench; and
   another semiconductor layer disposed on top of the dielectric coating to fill the trench;
   wherein the another medium comprises the another semiconductor layer, and wherein the formed mirror is to provide a total internal reflection (TIR) of light directed at the mirror substantially perpendicular to the semiconductor layer.

5. The optical apparatus of claim 4, wherein the semiconductor layer comprises silicon (Si) and the another semiconductor layer comprises polycrystalline silicon.

* * * * *